(12) United States Patent
Anderson et al.

(10) Patent No.: US 7,893,179 B2
(45) Date of Patent: Feb. 22, 2011

(54) 2-OCTYL (METH)ACRYLATE ADHESIVE COMPOSITION

(75) Inventors: Kelly S. Anderson, Houlton, WI (US); Kevin M. Lewandowski, Inver Grove Heights, MN (US); Duane D. Fansler, Dresser, WI (US); Babu N. Gaddam, Woodbury, MN (US); Eugene G. Joseph, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 307 days.

(21) Appl. No.: 12/102,579

(22) Filed: Apr. 14, 2008

(65) Prior Publication Data
US 2008/0213584 A1 Sep. 4, 2008

Related U.S. Application Data

(63) Continuation of application No. 11/549,162, filed on Oct. 13, 2006, now Pat. No. 7,385,020.

(51) Int. Cl.
*C08F 20/62* (2006.01)
*B32B 7/12* (2006.01)

(52) U.S. Cl. ................ 526/318; 526/317.1; 526/328.5; 428/343

(58) Field of Classification Search ............... 526/318, 526/317.1, 328.5; 428/343
See application file for complete search history.

(56) References Cited

U.S. PATENT DOCUMENTS

| | | | |
|---|---|---|---|
| 4,032,487 A | 6/1977 | Columbus | |
| 4,077,926 A | 3/1978 | Sanderson et al. | |
| 4,181,752 A | 1/1980 | Martens et al. | |
| 4,303,485 A | 12/1981 | Levens | |
| 4,418,120 A * | 11/1983 | Kealy et al. | ............. 428/343 |
| 4,619,979 A | 10/1986 | Kotnour et al. | |
| 4,737,559 A | 4/1988 | Kellen et al. | |
| 4,744,365 A | 5/1988 | Kaplan et al. | |
| 4,843,134 A * | 6/1989 | Kotnour et al. | ............. 526/318.4 |
| 5,475,063 A | 12/1995 | Kaplan et al. | |
| 5,637,646 A | 6/1997 | Ellis | |
| 5,804,610 A | 9/1998 | Hamer et al. | |
| 5,883,199 A | 3/1999 | McCarthy et al. | |
| 5,952,433 A | 9/1999 | Wang et al. | |
| 5,997,568 A | 12/1999 | Liu | |
| 6,075,118 A | 6/2000 | Wang et al. | |
| 6,093,792 A | 7/2000 | Gross et al. | |
| 6,111,060 A | 8/2000 | Gruber et al. | |
| 6,117,928 A | 9/2000 | Hiltunen et al. | |
| 6,143,863 A | 11/2000 | Gruber et al. | |
| 6,893,718 B2 | 5/2005 | Melancon et al. | |
| 2002/0132111 A1 * | 9/2002 | Zhou et al. | ............. 428/343 |

FOREIGN PATENT DOCUMENTS

| | | |
|---|---|---|
| WO | WO 84/04311 | 11/1984 |
| WO | WO 94/07949 | 4/1994 |
| WO | WO 96/22330 | 7/1996 |
| WO | WO 98/24951 | 6/1998 |
| WO | WO 98/50611 | 11/1998 |
| WO | WO 99/06456 | 2/1999 |
| WO | WO 99/50345 | 10/1999 |
| WO | WO 00/12606 | 3/2000 |

OTHER PUBLICATIONS

J.W. Leenslag et al, J. Appl. Polymer Science, vol. 29 (1984) pp. 2829-2842.
H.R. Kricheldorf, Chemosphere, vol. 43 (2001) 49-54.
Lewis, Sr., "Hawley's Condensed Chemical Dictionary", 2001, 14th Edition, John Wiley & Sons, Inc., New York.

* cited by examiner

*Primary Examiner*—Ling-Siu Choi
(74) *Attorney, Agent, or Firm*—Lisa P. Fulton

(57) ABSTRACT

A pressure sensitive adhesive composition comprising a 2-octyl (meth)acrylate/(meth)acrylic acid copolymer is described. The adhesive composition may be derived from renewable resources and provides good peel, shear and high temperature stability.

5 Claims, No Drawings

2-OCTYL (METH)ACRYLATE ADHESIVE COMPOSITION

CROSS-REFERENCE TO RELATED CASES

This application is a continuation of U.S. patent application Ser. No. 11/549,162, filed Oct. 13, 2006, now U.S. Pat. No. 7,385,020 the disclosure of which is herein incorporated by reference.

BACKGROUND

Pressure sensitive adhesives (PSAs) are known to possess properties including the following: (1) aggressive and permanent tack, (2) adherence with no more than finger pressure, (3) sufficient ability to hold onto an adherend or substrate, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

Only a limited number of classes of polymers have been found to function as PSAs. Among these polymer classes are natural and synthetic rubbers, (meth)acrylic polymers, silicones, block copolymers and olefins. Acrylic polymers have proven especially useful. Acrylic based PSAs are frequently prepared from isooctyl acrylate or 2-ethylhexyl acrylate. These adhesives have many desirable attributes such as high peel adhesion when applied to a wide variety of surfaces. Acrylic PSAs, however, do not typically provide high thermal stability and will slowly degrade upon exposure to higher temperature (e.g., above 125° C.). Thermal degradation of these known acrylic adhesives at higher temperatures reduces the cohesive strength of the adhesive and may generate bubble formation from high levels of outgassing, resulting in a loss of adhesion. It is desirable to provide silicone-free PSAs that will strongly adhere to surfaces at temperatures up to at least about 175° C. or even higher temperatures.

Further, acrylic PSAs are generally derived from petroleum feedstocks. The increase in the price of oil, and concomitant petroleum-derived products, has led to volatile prices and supply for many adhesive products. It is desirable to replace all or part of the petroleum-based feedstocks with those derived from renewable sources, such as plants, as such materials become relatively cheaper, and are therefore both economically and socially beneficial. Therefore, the need for such plant-derived materials has become increasingly significant.

SUMMARY

The present invention provides an adhesive composition derived from renewable resources. In particular, the present invention provides an adhesive composition derived, in part, from plant materials. In some embodiments, the present invention further provides an adhesive article, wherein the substrate or backing is also derived from renewable resources. The pressure sensitive adhesive composition comprises a 2-octyl (meth)acrylate/(meth)acrylic acid copolymer and a crosslinking agent. The pressure sensitive adhesive of the invention comprises the reaction product of the same. As used herein (meth)acrylate or (meth)acrylic is inclusive of methacrylate and acrylate.

The present invention provides a pressure sensitive (meth) acrylic adhesive that may be useful for adhering substrates that are exposed to high temperatures. The adhesive exhibits low outgassing or weight loss at elevated temperatures. Surprisingly, the adhesive of the invention typically exhibits a total weight loss of no greater than about 5 wt. % after 3.5 hours at 175° C. as determined by the test method described in the Examples. The adhesive composition may be extruded, coated, or sprayed directly onto a substrate or surface that is to be bonded to another substrate or surface.

The invention also provides adhesive articles such as tapes and the like comprising a layer of the foregoing pressure sensitive (meth)acrylic adhesive disposed on a support or backing. The support may be a release substrate or liner to provide a so-called transfer tape wherein the exposed adhesive may be placed in contact with a substrate or surface and the release liner may thereafter be stripped away from the adhesive to expose another portion of the adhesive for bonding to another substrate or surface. The adhesive article may be provided as a tape or an adhesive sheet which can be prepared by any of a variety of known methods such as by extruding, coating, or spraying the adhesive composition onto a backing layer. The pressure sensitive (meth)acrylic adhesive tape or sheet can be laminated onto a surface or substrate. The tape or sheet can also be die-cut into any desired shape.

The present adhesive composition, derived from 2-octyl (meth)acrylate, provides comparable adhesive properties when compared with other isomers of octyl (meth)acrylate, such as n-octyl and isoctyl. Further, the present adhesive compositions have lower viscosities than adhesives derived form other octyl isomers, such as isooctyl acrylate. The lower viscosity compositions advantageously are easier to coat.

DETAILED DESCRIPTION

The adhesive composition comprises
a) a copolymer comprising:
 1) 90 to 99.5 wt. % of 2-octyl(meth)acrylate, preferably 93 to 97 wt. %;
 2) 0.5 to 10 wt. % of a carboxylic acid functional comonomer, preferably (meth)acrylic acid;
 3) less than 10 wt. % of other monomers, preferably less than 5 wt. %, relative to the amounts of 1) and 2); and
b) a crosslinking agent.

In certain preferred embodiments, the copolymer of the adhesive composition consists essentially of:
 1) 90 to 99.5 wt. % of 2-octyl(meth)acrylate, preferably 93 to 97 wt. %;
 2) 0.5 to 10 wt. % of a carboxylic acid functional comonomer, preferably 1 to 7 wt. %.

The 2-octyl(meth)acrylate may be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid.

Up to 10% by weight based on the total weight of monomers of other monomers, such as monomers used to raise the $T_g$ of the copolymer, may be used in addition to monomers (1) and (2) above in the adhesive copolymer. For example, ethylenically unsaturated monomers whose homopolymers have a $T_g$ of at least about 0° C., preferably greater than 20° C., may be used.

Examples of other monomers that may be co-polymerized with the (meth)acrylate ester and carboxylic acid-functional monomers include (meth)acrylamides, alpha-olefins, vinyl ethers, allyl ethers, styrene and other aromatic vinyl compounds, maleic acid esters, 2-hydroxyethyl(meth)acrylate, cyclohexyl (meth)acrylate, t-butyl (meth)acrylate, phenyl (meth)acrylate, 2-phenoxyethyl (meth)acrylate, N-vinyl pyrrolidone, N-vinyl caprolactam, and substituted (meth)acrylamides such as N-ethyl (meth)acrylamide, N-hydroxyethyl (meth)acrylamide, N-octyl(meth)acrylamide, N-t-butyl (meth)acrylamide, N,N-dimethyl (meth)acrylamide, N,N-diethyl (meth)acrylamide, and N-ethyl-N-dihydroxyethyl (meth)acrylamide.

The copolymerizable mixture may optionally further comprise chain transfer agents to control the molecular weight of the resultant polymer. Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The polymerization mixture may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

However, the use of a chain transfer agent is generally not necessary. Applicants have discovered that the instant 2-octyl (meth)acrylate adhesives have generally lower inherent and solution viscosities when compared to isomeric octyl(meth)acrylates, at the same concentrations, and under the same polymerization conditions. While not wishing to be bound by theory, it is believed that the instant octyl(meth)acrylates, having a tertiary hydrogen atom alpha to the ester hydroxyloxygen atom, serve as "internal" chain transfer agents to control the molecular weight.

In the practice of the invention, the copolymers can be polymerized by techniques including, but not limited to, the conventional techniques of solvent polymerization, dispersion polymerization, and solventless bulk polymerization, and radiation polymerization, including processes using ultraviolet light, electron beam, and gamma radiation. The monomer mixture may comprise a polymerization initiator, especially a thermal initiator or a photoinitiator of a type and in an amount effective to polymerize the comonomers.

Initiators useful in preparing the (meth)acrylate adhesive polymers used in the present invention are initiators that, on exposure to heat or light, generate free-radicals which initiate (co)polymerization of the monomer mixture. These initiators can be employed in concentrations ranging from about 0.0001 to about 3.0 pbw, preferably from about 0.001 to about 1.0 pbw, and more preferably from about 0.005 to about 0.5 pbw, per 100 pbw of the monomer composition.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

Suitable initiators include but are not limited to those selected from the group consisting of azo compounds such as VAZO 64 (2,2'-azobis(isobutyronitrile)), VAZO 52 (2,2'-azobis(2,4-dimethylpentanenitrile)), and VAZO 67 (2,2'-azobis-(2-methylbutyronitrile)) available from E.I. du Pont de Nemours Co., peroxides such as benzoyl peroxide and lauroyl peroxide, and mixtures thereof. The preferred oil-soluble thermal initiator is (2,2'-azobis-(2-methylbutyronitrile)). When used, initiators may comprise from about 0.05 to about 1 part by weight, preferably about 0.1 to about 0.5 part by weight based on 100 parts by weight of monomer components in the pressure sensitive adhesive.

In a typical photopolymerization method, a monomer mixture may be irradiated with ultraviolet (UV) rays in the presence of a photopolymerization initiator (i.e., photoinitiators). Preferred photoinitiators are those available under the trade designations IRGACURE and DAROCUR from Ciba Speciality Chemical Corp., Tarrytown, N.Y. and include 1-hydroxy cyclohexyl phenyl ketone (IRGACURE 184), 2,2-dimethoxy-1,2-diphenylethan-1-one (IRGACURE 651), bis (2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173). Particularly preferred photoinitiators are IRGACURE 819, 184 and 2959.

Solventless polymerization methods, such as the continuous free radical polymerization method described in U.S. Pat. Nos. 4,619,979 and 4,843,134; the essentially adiabatic polymerization methods using a batch reactor described in U.S. Pat. No. 5,637,646; and, the methods described for polymerizing packaged pre-adhesive compositions described in U.S. Pat. No. 5,804,610 may also be utilized to prepare the polymers.

The packaging material is made of a material that when combined with the base copolymer or plasticized pressure sensitive adhesive composition does not substantially adversely affect the desired pressure sensitive adhesive characteristics. A hot melt coated pressure sensitive adhesive produced from a mixture of the pressure sensitive adhesive and the packaging material may have improved pressure sensitive adhesive properties compared to hot melt coated pressure sensitive adhesive produced from pressure sensitive adhesive alone.

The packaging material should be appropriate for the polymerization method used. For example, with photopolymerization, it is necessary to use a film material that is sufficiently transparent to ultraviolet radiation at the wavelengths necessary to effect polymerization. Polymerization can be effected by exposure to ultraviolet (UV) radiation as described in U.S. Pat. No. 4,181,752. In a preferred embodiment, the polymerization is carried out with UV black lights having over 60 percent, and preferably over 75 percent of their emission spectra between 280 to 400 nanometers (nm), with an intensity between about 0.1 to about 25 mW/cm$^2$.

In another preferred solventless polymerization method, the pressure sensitive adhesives of the present invention are prepared by photoinitiated polymerization methods according to the technique described in U.S. Pat. No. 4,181,752, hereby incorporated by reference. The comonomers, and a photoinitiator are mixed together in the absence of solvent and partially polymerized to a viscosity in the range of from about 500 cps to about 50,000 cps to achieve a coatable syrup. Alternatively, the monomers and photoinitiator are mixed in the absence of solvent and partially polymerized to make a syrup. The plasticizing agent is then added to the syrup to make a coatable mixture for further polymerization. In yet another way, the monomers, and plasticizing agent may be mixed with a thixotropic agent such as fumed hydrophilic silica to achieve a coatable thickness. The crosslinking agent and any other ingredients are then added to the prepolymerized syrup or thickened plasticized monomer mixture. Alternatively, these ingredients (with the exception of the crosslinking agent) can be added directly to the monomer mixture prior to pre-polymerization.

The resulting composition is coated onto a substrate (which may be transparent to ultraviolet radiation) and polymerized in an inert (i.e., oxygen free) atmosphere, e.g., a nitrogen atmosphere by exposure to ultraviolet radiation. Examples of suitable substrates include release liners (e.g., silicone release liners) and tape backings (which may be primed or unprimed paper or plastic). A sufficiently inert atmosphere can also be achieved by covering a layer of the polymerizable coating with a plastic film which is substantially transparent to ultraviolet radiation, and irradiating through that film in air as described in the aforementioned patent using ultraviolet lamps. Alternatively, instead of covering the polymerizable coating, an oxidizable tin compound may be added to the polymerizable syrup to increase the tolerance of the syrup to oxygen as described in U.S. Pat. No. 4,303,485. The ultraviolet light source preferably has 90% of the emissions between 280 and 400 nm (more preferably between 300 and 400 nm), with a maximum at 351 nm.

The first component polymer may be prepared (e.g., by solution polymerization followed by isolation). Any residual monomer and/or solvents used in the preparation may be removed by conventional techniques such as distillation, vacuum evaporation, etc., to reduce the residual content to less than 2 wt. %, prior to crosslinking. The polymerizations may be conducted in the presence of suitable solvents such as ethyl acetate, toluene and tetrahydrofuran that are unreactive with the acid or ester functional groups of the monomers.

In order to increase cohesive strength of the poly(meth)acrylate pressure sensitive adhesives, a crosslinking agent may be incorporated into the adhesive composition. Two main types of chemical crosslinking agents are exemplary. The first crosslinking additive is a thermal crosslinking agent such as multifunctional aziridine, isocyanate, oxazole and epoxy compounds. One example of aziridine crosslinker is 1,1'-(1,3-phenylene dicarbonyl)-bis-(2-methylaziridine) (CAS No. 7652-64-4). Other bisamide crosslinking agents are described in U.S. Pat. No. 6,893,718 (Melancon et al.), incorporated herein by reference. Common polyfunctional isocyanate crosslinkers are trimethylolpropane toluene diisocyanate, toluene diisocyanate, and others known in the art. Such chemical crosslinkers can be added into solvent-based PSAs after polymerization and activated by heat during oven drying of the coated adhesive.

Bisamide crosslinking agents may be of the formula

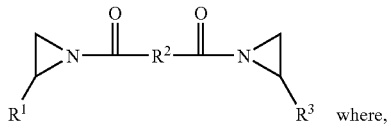 where, $R^1$ and $R^3$ are independently selected from the group consisting of H and $C_nH_{2n+1}$, where n is an integer ranging from 1 to 5, $R^2$ is a divalent radical selected from the group consisting of phenyl, substituted phenyl, triazine, and —$C_nH_{2m}$—, where m is an integer ranging from 1 to 10, and combinations thereof.

Multifunctional oxazoline crosslinking agents useful in this invention are those that contain two or more groups per molecule selected from the group consisting of 2-oxazolines, 2 oxazines and combinations thereof. Preferred 1,3-oxazyl heterocyclic compounds are 1,3-oxazolines, and a particularly preferred 1,3-oxazoline is 2-phenyl-2-oxazoline. Bisoxazolines are typically derived from polycarboxylic acids and such polycarboxylic acids include, but are not limited to aromatic acids; for example, isophthalic acid, terephthalic acid, 5-t-butylisophthalic acid, trimesic acid, 1,2,4,5-benezenetetracarboxylic acid and 2,6-naphthalene dicarboxylic acid. The preferred polycarboxylic acids include isophthalic acid, terephthalic acid and trimesic acid.

Polyfunctional 1,3-oxazyl heterocyclic compounds useful in this invention can be conveniently prepared by the reaction of the corresponding esters of a polycarboxylic acids and alkanolamines. Nonlimiting examples of poly(1,3-oxazyl heterocyclic) compounds including bisoxazolines are those having a nucleus represented by the following Formula I:

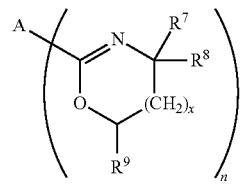

wherein A is selected from the group consisting of a cyclic or acyclic aliphatic or substituted cyclic or acyclic aliphatic moiety having from 1 to 20 carbon atoms or an aromatic (aryl) mono- or multinuclear or aliphatic substituted aryl residue having from 6 to 20 carbon atoms and a polymeric or oligomeric residue comprising from about 2 to 200,000 repeating units;

$R^7$ independently represents H, $CH_3$, $CH_2CH_3$, or $C_6H_5$;

$R^8$ and $R^9$ independently represent H or $CH_3$, preferably $R^7$ and $R^9$ are not both $CH_3$;

x represents an integer of 0 or 1;

n is an integer of 2 or more, preferably 2 or 3.

Useful multifunctional oxazoline crosslinking agents include but is not limited to 4,4'-5,5'-tetrahydro-2,2'-bisoxazole, (that is, 2,2'-bis(2-oxazoline)); 2,2'-(alkanediyl)bis[4,5-dihydrooxazole], for example, 2,2'-(1,4-butanediyl)bis[4,5-dihydrooxazole] and 2,2'-(1,2-ethanediyl)bis[4,5-dihydrooxazole]; 2,2'-(arylene)bis[4,5-dihydrooxazole], e.g., 2,2'-(1,4-phenylene)bis[4,5-dihydrooxazole]; 2,2'-(1,5-naphthalenyl)bis[4,5-dihydrooxazole] and 2,2'-(1,8-anthracenyl)bis[4,5-dihydrooxazole]; sulfonyl, oxy, thio or alkylene bis 2-(arylene)[4,5-dihydrooxazole], for example, sulfonyl bis 2-(1,4-phenylene)bis[4,5-dihydrooxazole], oxybis 2-(1,4-phenylene)bis[4,5-dihydrooxazole], thiobis 2-(1,4-phenylene)bis[4,5-dihydrooxazole] and methylene bis 2-(1,4-phenylene)bis[4,5-dihydrooxazole]; 2,2',2''-(arylene tris[4,5-dihydrooxazole], e.g., 2,2',2''-(1,3,5-phenylene tris [4,5-dihydrooxazole]; 2,2',2'',2'''-(arylene tetra[4,5-dihydrooxazole], for example, 2,2',2'',2'''-(1,2,4,5-phenylene tetra [4,5-dihydrooxazole] and oligomeric and polymeric materials having terminal oxazoline groups.

Typically, the relative amounts of (meth)acrylic acid co-monomer and crosslinking agent is selected so that the ratio of the number of equivalents of crosslinker functional groups (such as amide, oxazole, isocyanate or epoxy functional groups) to the number of equivalents of carboxylic acid groups is less than or equal to about 0.1. More typically, the ratio of the number of equivalents of amide groups to the number of equivalents of carboxylic acid groups is less than about 0.05, and generally will be between 0.0001 and 0.05. Most typically, the ratio of the number of equivalents of crosslinker functional groups to the number of equivalents of carboxylic acid groups will be between 0.0001 and 0.05.

In another embodiment, chemical crosslinkers, which rely upon free radicals to carry out the crosslinking reaction, may be employed. Reagents such as, for example, peroxides serve as a source of free radicals. When heated sufficiently, these precursors will generate free radicals which bring about a crosslinking reaction of the polymer. A common free radical generating reagent is benzoyl peroxide. Free radical generators are required only in small quantities, but generally require higher temperatures to complete a crosslinking reaction than those required for the bisamide and isocyanate reagents. The second type of crosslinking additive is a photosensitive crosslinker, which is activated by high intensity ultraviolet (UV) light. Two common photosensitive crosslinkers used for (meth)acrylic PSAs are benzophenone and copolymerizable aromatic ketone monomers as described in U.S. Pat. No. 4,737,559 (Kellen et al.). Another photocrosslinker, which can be post-added to the solution polymer and activated by UV light is a triazine, for example, 2,4-bis(trichloromethyl)-6-(4-methoxy-phenyl)-s-triazine. These crosslinkers are activated by UV light generated from sources such as medium pressure mercury lamps or a UV blacklight.

Useful polyisocyanates include aliphatic, alicyclic, and aromatic diisocyanates, and mixtures thereof. A number of such diisocyanates are commercially available. Representative examples of suitable diisocyanates include hexamethylene diisocyanate (HDT), trimethyl hexamethylene diisocyanate (TMHDI), m- and p-tetramethylxylene diisocyanate (TMXDI), diphenylmethane diisocyanate (MDT), napthalene diisocyanate (NDI), phenylene diisocyanate, isophorone diisocyanate (IPDI), toluene diisocyanate (TDI), bis(4-isocyanatocyclohexyl) methane ($H_{12}$MDI), and the like, and mixtures thereof. Useful polyisocyanates also include derivatives of the above-listed monomeric polyisocyanates. These derivatives include, but are not limited to, polyisocyanates containing biuret groups, such as the biuret adduct of hexamethylene diisocyanate (HDI) available from Bayer Corp., Pittsburgh, Pa. under the trade designation DESMODUR N-100, polyisocyanates containing isocyanurate groups, such as that available from Bayer Corp., Pittsburgh, Pa. under the trade designation DESMODUR N-3300, as well as polyisocyanates containing urethane groups, uretdione groups, carbodiimide groups, allophonate groups, and the like. If desired, small amounts of one or more polyisocyanates having three or more isocyanate groups can be added to effect a degree of crosslinking. Preferred polyisocyanates include aliphatic diisocyanates and derivatives thereof, with IPDI being most preferred.

Hydrolyzable, free-radically copolymerizable crosslinkers, such as monoethylenically unsaturated mono-, di-, and trialkoxysilane compounds including, but not limited to, methacryloxypropyltrimethoxysilane (available from Gelest, Inc., Tullytown, Pa.), vinyl dimethylethoxysilane, vinyl methyl diethoxysilane, vinyltriethoxysilane, vinyltrimethoxysilane, vinyltriphenoxysilane, and the like, are also useful crosslinking agents. Crosslinking may also be achieved using high energy electromagnetic radiation such as gamma or e-beam radiation. In this case, no crosslinker may be required.

Other additives can be included in the polymerizable mixture or added at the time of compounding or coating to change the properties of the pressure sensitive adhesive. Such additives, include pigments, tackifiers, fillers such as glass or polymeric bubbles or beads (which may be expanded or unexpanded), hydrophobic or hydrophilic silica, calcium carbonate, glass or synthetic fibers, blowing agents, toughening agents, reinforcing agents, fire retardants, antioxidants, and stabilizers. The additives are added in amounts sufficient to obtain the desired end properties.

If other additives are used, then up to about 40% by weight, preferably less than 30% by weight, and more preferably less than 5% by weight based on the dry weight of the total adhesive polymer, would be suitable.

A wide variety of resinous (or synthetic) materials commonly used in the art to impart or enhance tack of pressure sensitive adhesive compositions may be used as a tackifier (i.e., tackifying resin). Examples include rosin, rosin esters of glycerol or pentaerythritol, hydrogenated rosins, polyterpene resins such as polymerized beta-pinene, coumaroneindene resins, "C5" and "C9" polymerized petroleum fractions, and the like. The use of such tack modifiers is common in the art, as is described in the Handbook of Pressure Sensitive Adhesive Technology, Second Edition, D. Satas, ed., Van Nostrand Reinhold, New York, N.Y., 1989. A tackifying resin is added in amounts required to achieve the desired tack level. Examples of suitable commercially available tackifiers include synthetic ester resins, such as that available under the trade designation FORAL 85 from Hercules Inc., Wilmington, Del., and aliphatic/aromatic hydrocarbon resins, such as those available under the trade designation ESCOREZ 2000 from Exxon Chemical Co., Houston, Tex. This is typically achieved by adding from 1 part to about 300 parts by weight of tackifying resin per 100 parts by weight of an acrylate copolymer. The tackifying resin is selected to provide the acrylate copolymers with an adequate degree of tack to maintain the resultant composition balanced pressure sensitive adhesive properties including shear and peel adhesion. As is known in the art, not all tackifier resins interact with the acrylate copolymer in the same manner; therefore, some minor amount of experimentation may be required to select the appropriate tackifier resin and to achieve optimum adhesive performance. Such minor experimentation is well within the capability of one skilled in the adhesive art.

Plasticizing agents selected for use in the polymerizable compositions of the present invention possess a range of properties. Generally, the plasticizing agents can be liquid or solid, have a range of molecular weights and architectures, are compatible with the base copolymers, monomeric or polymeric, non-volatile and non-reactive. Additionally, mixtures of solid and liquid, monomeric and polymeric and other combinations of plasticizing agents can be used in the present invention.

Generally, liquid plasticizing agents are readily compoundable with the base copolymers and/or can be chosen to be miscible with comonomers for plasticized pressure sensitive adhesive compositions prepared using bulk polymerization methods. In addition, liquid plasticizing agents may be delivered directly to non-tacky base copolymers or onto already coated base copolymer films and are typically absorbed quickly to activate the pressure sensitive adhesive properties.

Although somewhat more challenging to use, solid plasticizing agents can advantageously be used in applications, processes or articles where the controlled plasticization of the base copolymer is desired. For example, hot melt processible pressure sensitive adhesive compositions can be easily transported and handled prior to melt compounding if both the base copolymer and plasticizing agent components are solid and non-tacky. Once heated to the melting or glass transition temperature of the solid plasticizing agent, the base copolymer is plasticized and the mixture exhibits pressure sensitive adhesive properties.

Additionally, the plasticizing agents can have a range of molecular weights and architectures. That is, the plasticizing agents can be either polymeric or monomeric in nature. Typically, monomeric plasticizing agents are derived from low molecular weight acids or alcohols, which are then esterified with respectively a monofunctional alcohol or monofunctional acid. Examples of these are esters of mono- and multibasic acids, such as isopropyl myristate, dibutyl phthalate, diisoctyl phthalate, dibutyl adipate, dibutylsebacate and the like. Useful polymeric plasticizing agents are non-acrylic and are typically derived from cationically or free-radically polymerizable, condensation polymerizable or ring-opening polymerizable monomers to make low molecular weight polymers. Examples of these polymeric plasticizing agents include materials such as polyurethanes, polyureas, polyvinylethers, polyethers, polyesters and the like. As used in this application "non-acrylic" means the polymeric plasticizing agent contains less than about 20% by weight of any (meth) acrylic monomers.

Additionally, useful plasticizing agents are non-reactive, thus preventing copolymerization with the comonomers of the base copolymer. Thus, plasticizing agents having acrylate functionality, methacrylate functionality, styrene functionality, or other ethylenically unsaturated, free radically reactive functional groups are generally not used.

Particularly useful plasticizing agents include polyalkylene oxides having weight average molecular weights of about 150 to about 5,000, preferably of about 150 to about 1,500, such as polyethylene oxides, polypropylene oxides, polyethylene glycols; alkyl or aryl functionalized polyalkylene oxides, such as PYCAL 94 (a phenyl ether of polyethylene oxide, commercially available from ICI Chemicals); benzoyl functionalized polyethers, such as BENZOFLEX 400 (polypropylene glycol dibenzoate, commercially available from Velsicol Chemicals) and monomethyl ethers of polyethylene oxides; monomeric adipates such as dioctyl adipate, dibutoxyethoxyethyl adipate and dibutoxypropoxypropyl adipate; polymeric adipates such as polyester adipates; citrates, such as acetyltri-n-butyl citrate, phthalates such as butyl benzylphthalates, trimellitates, sebacates, polyesters, such as those known under the tradename Paraplex (available from C.P. Hall Co); phosphate esters, such as those known under the tradename of Santicizer (available from Ferro) such as 2-ethylhexyl diphenyl diphosphate and t-butylphenyl diphenyl phosphate; glutarates such as Plasthall 7050 (a dialkyl diether glutarate available from C.P. Hall Co.); and mixtures thereof.

The plasticizing agent may be used in amounts of from about 1 to 100 parts by weight per 100 parts of the copolymer. In some embodiments, the plasticizing agent is present in amounts from about 3 to 50 pph. Most preferably, the plasticizing agent is present in amounts up to 10 wt. % plasticizer, relative to the weight of the copolymer.

The pressure sensitive adhesive composition can be applied to any suitable substrate that can be a sheet, a fiber, or a shaped article. However, the preferred substrates are those used for pressure sensitive adhesive products. The pressure sensitive adhesive composition can be applied to at least one major surface of suitable flexible or inflexible backing materials before crosslinking is initiated.

The present invention further provides adhesive articles comprising the cured adhesive composition disposed on a backing or suitable substrate. In addition to a variety of traditional pressure sensitive adhesive articles, such as tapes, labels, decals, transfer tapes and other articles the pressure sensitive adhesive article can be used in decorative, light management and optical articles.

Suitable materials useful as the flexible support or backing for the adhesive articles of the invention include, but are not limited to, polyolefins such as polyethylene, polypropylene (including isotactic polypropylene), polystyrene, polyester, including poly(ethylene terephthalate), polyvinyl chloride, poly(butylene terephthalate), poly(caprolactam), polyvinyl alcohol, polyurethane, poly(vinylidene fluoride), cellulose and cellulose derivates, such as cellulose acetate and cellophane, and the like. Commercially available backing materials useful in the invention include kraft paper (available from Monadnock Paper, Inc.); spun-bond poly(ethylene) and poly (propylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

Typical examples of flexible backing materials employed as conventional tape backing that may be useful for the adhesive compositions include those made of paper, plastic films such as polypropylene, polyethylene, polyester (e.g., polyethylene terephthalate), cellulose acetate, and ethyl cellulose. Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metallized polymer films, or ceramic sheet materials may take the form of any article conventionally known to be utilized with pressure sensitive adhesive compositions such as labels, tapes, signs, covers, marking indicia, and the like.

Preferably, the adhesive article comprises a backing of aliphatic polyester. Aliphatic polyesters useful in the present invention include homo- and copolymers of poly(hydroxyalkanoates) and homo- and copolymers of those aliphatic polyesters derived from the reaction product of one or more alkanediols with one or more alkanedicarboxylic acids (or acyl derivatives). Miscible and immiscible blends of aliphatic polyesters with one or more additional semicrystalline or amorphous polymers may also be used.

One useful class of aliphatic polyesters are poly(hydroxyalkanoates), derived by condensation or ring-opening polymerization of hydroxy acids, or derivatives thereof. Suitable poly(hydroxyalkanoates) may be represented by the formula $H(O-R^4-C(O)-)_xOH$, where $R^4$ is an alkylene moiety having 1 to 20 carbon atoms, preferably 1 to 12 carbon atoms, that may be linear or branched. "x" is a number such that the ester is polymeric, and is preferably a number such that the molecular weight of the aliphatic polyester is 10,000 to 300,000 and is preferably from about 30,000 to 200,000. $R^4$ may further comprise one or more catenary (i.e. in chain) ether oxygen atoms. Generally the $R^4$ group of the hydroxyl acid is such that the pendant hydroxyl group is a primary or secondary hydroxyl group.

Useful poly(hydroxyalkanoates) include, for example, homo- and copolymers of poly(3-hydroxybutyrate), poly(4-hydroxybutyrate), poly(3-hydroxyvalerate), poly(lactic acid) (as known as polylactide), poly(3-hydroxypropanoate), poly (4-hydropentanoate), poly(3-hydroxypentanoate), poly(3-hydroxyhexanoate), poly(3-hydroxyheptanoate), poly(3-hydroxyoctanoate), polydioxanone, and polycaprolactone, polyglycolic acid (also known as polyglycolide). Copolymers of two or more of the above hydroxy acids may also be used, for example, poly(3-hydroxybutyrate-co-3-hydroxyvalerate), poly(lactate-co-3-hydroxypropanoate) and poly (glycolide-co-p-dioxanone). Blends of two or more of the poly(hydroxyalkanoates) may also be used, as well as blends with one or more semicrystalline or amorphous polymer.

Another useful class of aliphatic polyesters includes those aliphatic polyesters derived from the reaction product of one or more alkanediols with one or more alkanedicarboxylic acids (or acyl derivatives). Such polyesters have the general formula

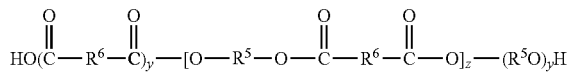

where $R^5$ and $R^6$ each represent an alkylene moiety that may be linear or branched having from 1 to 20, preferably 1 to 12 carbon atoms, and z is a number such that the ester is polymeric, and is preferably a number such that the molecular weight of the aliphatic polyester is 10,000 to 300,000 and is preferably from about 30,000 to 200,000. Each y is independently 0 or 1. $R^5$ and $R^6$ may further comprise one or more catenary (i.e. in chain) ether oxygen atoms.

Examples of aliphatic polyesters include those homo- and copolymers derived from (a) one or more of the following diacids (or derivative thereof): succinic acid, adipic acid, 1,12 dicarboxydodecane, fumaric acid, and maleic acid and (b) one of more of the following diols: ethylene glycol, polyethylene glycol, 1,2-propane diol, 1,3-propanediol, 1,2-propanediol, 1,2-butanediol, 1,3-butanediol, 1,4-butanediol, 1,6-hexanediol, diethylene glycol, and polypropylene glycol, and (c) optionally a small amount, i.e. 0.5-7.0 mole % of a polyol with a functionality greater than two such as glycerol, neopentyl glycol, and pentaerythritol.

Such polymers may include polybutylenesuccinate homopolymer, polybutylene adipate homopolmer, polybutyleneadipate-succinate copolymer, polyethylenesuccinate-adipate copolymer, polyethylene adipate homopolymer.

Commercially available aliphatic polyesters include polylactide, polyglycolide, polylactide-co-glycolide, poly(L-lactide-co-trimethylene carbonate), poly(dioxanone), poly(butylene succinate), and poly(butylene adipate).

Especially useful aliphatic polyesters include those derived from semicrystalline polylactic acid. Polylactic acid (or polylactides) has lactic acid as its principle degradation product, which is commonly found in nature, is non-toxic and is widely used in the food, pharmaceutical and medical industries. The polymer may be prepared by ring-opening polymerization of the lactic acid dimer, lactide. Lactic acid is optically active and the dimer appears in four different forms: L,L-lactide, D,D-lactide, D,L-lactide (meso lactide) and a racemic mixture of L,L- and D,D-. By polymerizing these lactides as pure compounds or as blends, polylactide polymers may be obtained having different stereochemistries and different physical properties, including crystallinity. The L,L- or D,D-lactide yields semicrystalline polylactide and are preferred, while the polylactide derived from the D,L-lactide is amorphous.

Copolymers, including block and random copolymers, of poly(lactic acid) with other aliphatic polyesters may also be used. Useful co-monomers include glycolide, beta-propiolactone, tetramethyglycolide, beta-butyrolactone, gamma-butyrolactone, pivalolactone, 2-hydroxybutyric acid, alpha-hydroxyisobutyric acid, alpha-hydroxyvaleric acid, alpha-hydroxyisovaleric acid, alpha-hydroxycaproic acid, alpha-hydroxyethylbutyric acid, alpha-hydroxyisocaproic acid, alpha-hydroxy-beta-methylvaleric acid, alpha-hydroxyoctanoic acid, alpha-hydroxydecanoic acid, alpha-hydroxymyristic acid, and alpha-hydroxystearic acid.

Blends of poly(lactic acid) and one or more other aliphatic polyesters, or one or more other polymers may also be used in the present invention. Examples of useful blends include poly(lactic acid) and poly(vinyl alcohol), polyethylene glycol/polysuccinate, polyethylene oxide, polycaprolactone and polyglycolide.

Useful polylactides may be prepared as described in U.S. Pat. No. 6,111,060 (Gruber, et al.), U.S. Pat. No. 5,997,568 (Liu), U.S. Pat. No. 4,744,365 (Kaplan et al.), U.S. Pat. No. 5,475,063 (Kaplan et al.), WO 98/24951 (Tsai et al.), WO 00/12606 (Tsai et al.), WO 84/04311 (Lin), U.S. Pat. No. 6,117,928 (Hiltunen et al.), U.S. Pat. No. 5,883,199 (McCarthy et al.), WO 99/50345 (Kolstad et al.), WO 99/06456 (Wang et al.), WO 94/07949 (Gruber et al.), WO 96/22330 (Randall et al.), WO 98/50611 (Ryan et al.), U.S. Pat. No. 6,143,863 (Gruber et al.), U.S. Pat. No. 6,093,792 (Gross et al.), U.S. Pat. No. 6,075,118 (Wang et al.), and U.S. Pat. No. 5,952,433 (Wang et al.), the disclosure of each U.S. patent incorporated herein by reference. Reference may also be made to J. W. Leenslag, et al., J. Appl. Polymer Science, vol. 29 (1984), pp 2829-2842, and H. R. Kricheldorf, Chemosphere, vol. 43, (2001) 49-54.

The above-described adhesive compositions are coated on a substrate using conventional coating techniques modified as appropriate to the particular substrate. For example, these compositions can be applied to a variety of solid substrates by methods such as roll, brush coating, flow, dip, spin, spray, knife, spread, wire, gravure, doctor blade and die coating. These various methods of coating allow the compositions to be placed on the substrate at variable thicknesses thus allowing a wider range of use of the compositions.

The coating thickness will vary depending upon various factors such as, for example, the particular application, the coating formulation, and the nature of the substrate (e.g., its absorbency, porosity, surface roughness, crepe, chemical composition, etc.). Coating thicknesses of 2-250 micrometers (dry thickness), preferably about 25 to 200 micrometers, are contemplated. The coatable adhesive composition may be of any desirable concentration for subsequent coating, but is typically between 30 to 70 wt. % solids, and more typically between 50 and 35 wt. % solids, with the remainder solvent. The desired concentration may be achieved by further dilution of the adhesive composition, or by partial drying. Generally, the adhesive composition is coated on the backing and heated to effect the crosslinking.

The flexible support or backing may also comprise a release-coated substrate. Such substrates are typically employed when an adhesive transfer tape is provided. Examples of release-coated substrates are well known in the art. They include, by way of example, silicone-coated kraft paper and the like. Tapes of the invention may also incorporate a low adhesion backsize (LAB). Typically this LAB is applied to the tape backing surface that is opposite that bearing the pressure sensitive adhesive. LABs are known in the art.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

Test Methods

Peel Adhesion Testing

The peel adhesion test method used was similar to test method ASTM D 3330-78 except that a glass substrate was used in place of stainless steel. Two 1.3 centimeter (0.5 inch) strips of sample tapes were adhered to a glass plate by rolling a 2 kilogram (4.5 pounds) roller onto the tape. The bonded assembly dwelled at room temperature for about one minute and was tested for 180° peel adhesion using an IMASS slip/peel tester (Model 3M90, commercially available from Instrumentors Inc., Strongsville, Ohio) at a rate of 229 centimeters per minute (90 inches per minute). Peel force was measured in ounces per 0.5 inch and converted to Newtons per decimeter (N/dm). The tests were run at 23° C. and 50% relative humidity unless otherwise specified.

Shear Strength Testing

The shear strength test method used was similar to test method ASTM D-3654-78, PSTC-7. Strips of sample tapes 1.3 centimeter (0.5 inch) wide were adhered to stainless steel plates and cut down to leave 1.3 centimeter by 1.3 centimeter (0.5 inch by 0.5 inch) square on the steel plates. A weight of 2 kilograms (4.5 pounds) was rolled over the adhered portion. A weight of 1,000 grams was attached to each sample which was suspended until the sample failed. The time of failure as well as the mode of failure was noted (adhesive, cohesive, or mixed). Cohesive failure means that adhesive is left both on the steel plate and the film, adhesive failure means that no adhesive is left on the steel plate and mixed means that some adhesive is left on the steel plate. Samples were run in triplicate and averaged. The tests were run at 23° C. and 50% relative humidity unless otherwise specified. In some cases the same test was run with fiberboard (FB) as the substrate.

Preparative Example 1

2-octyl acrylate

A mixture of 2-octanol (268.51 grams, 2.1 mol), AA (183.75 grams, 2.6 mol), p-toluenesulfonic acid monohydrate (5.00 grams, 26 mmol), toluene (250 grams) and phenothiazine (1.0 grams) was heated to reflux. Water was separated from the toluene/water azeotrope using a Dean Stark distillation trap. After six hours at reflux a total of 37 milliliters of water was collected in the trap. The reaction mixture was washed with 1 Molar aqueous sodium hydroxide (200 milliliters), then concentrated under reduced pressure. The remaining oil was distilled under reduced pressure (65-67° C. at 2 mmHg) to give the product as a colorless oil. (Yield: 248.6 grams)

Examples 1-2 and Comparative Examples C1-C2

Part 1: Solution Polymerizations

For Examples 1 and 2 solution co-polymerizations of 2-OA with AA were performed by combining the materials shown in Table 1 in a glass jar, purging with nitrogen for 15 minutes, and sealing the jars. The jars were placed in a 60° C. water bath oscillating at 110 rpm for 18-20 hours. The same procedure was used for Comparative Examples C1 and C2 except that IOA was used instead of 2-OA. The molecular weight ($M_w$) and PDI of the resulting polymers were determined using GPC and the Inherent viscosities (IV) were measured using a #50 viscometer tube at a solution concentration of 0.5 grams/deciliter in THF. These data are presented in Table 1 below.

TABLE 1

| Example | 2-OA (grams) | IOA (grams) | AA (grams) | VAZO 67 (grams) | Ethyl acetate (grams) | IV | $M_w$ (grams/mole) | PDI |
|---|---|---|---|---|---|---|---|---|
| 1 | 23.75 | — | 1.25 | 0.025 | 37.5 | 0.9 | $3.7 \times 10^5$ | 3.8 |
| 2 | 23.25 | — | 1.75 | 0.025 | 37.5 | 1.0 | $3.9 \times 10^5$ | 4.1 |
| C1 | — | 23.75 | 1.25 | 0.025 | 58.3 | 1.0 | $5.3 \times 10^5$ | 5.0 |
| C2 | — | 23.25 | 1.75 | 0.025 | 37.5 | 1.7 | $7.7 \times 10^5$ | 6.2 |

Part 2: Preparation and Testing of Tape Samples

To prepare tape samples, 10.0 grams of the solutions prepared in Table 1 above were placed into a vial along with the corresponding amount of B-212 chemical crosslinker. The amount of B-212 in the formulations was varied from 0 to 0.3 weight % as shown in Table 2. The resulting solutions were coated with a knife coater onto a primed PET film. The knife height was set to 102-127 micrometers (4-5 mils) above the polyester to get a coating that is about 25 micrometers (1 mil) when dried. The coated solution was allowed to air dry for 2 minutes to remove the solvent. The coated PET sheet was then taped onto a thin aluminum panel and placed into an oven at 70° C. for 5 minutes. After the sample was removed from the oven, a release liner was placed on the adhesive to protect the coating. The coated films were allowed to equilibrate in a constant temperature/constant humidity (23° C./50% Relative Humidity) room for 24 hours prior to testing. The tape testing was performed as described in the test methods above, the data are presented in Table 2.

TABLE 2

| Example | B-212 Crosslinker Level (wt %) | Peel Adhesion (N/dm) | Shear Strength (minutes) |
|---|---|---|---|
| 1-A | 0 | 60 | 3 (cohesive) |
| 1-B | 0.1 | 56 | 463 (cohesive) |
| 1-C | 0.3 | 47 | 238 (adhesive) |
| 2-A | 0 | 57 | 15 (cohesive) |
| 2-B | 0.1 | 58 | 5993 (cohesive) |
| 2-C | 0.3 | 53 | 1015 (adhesive) |
| C1-A | 0 | 68 | 5 (cohesive) |
| C1-B | 0.1 | 57 | 72 (cohesive) |
| C1-C | 0.3 | 43 | 136 (adhesive) |
| C2-A | 0 | 62 | 24 (cohesive) |
| C2-B | 0.1 | 62 | 5614 (cohesive) |
| C2-C | 0.3 | 50 | 4352 (mixed mode) |

Examples 3-5 and Comparative Examples C3-C5

Part 1: Solution Polymerizations

For Examples 3-5 solution co-polymerizations of 2-OA with AA were performed by combining the materials shown in Table 3 in a glass jar, purging with nitrogen for 15 minutes, and sealing the jars. The jars were placed in a 60° C. water bath oscillating at 110 rpm for 24 hours. The same procedure was used for Comparative Examples C3-C5 except that IOA was used instead of 2-OA. The Inherent viscosities (IV) were measured using a # 50 viscometer tube at a solution concentration of 0.5 grams/deciliter in THF. Brookfield viscosity was measured at room temperature using a Brookfield viscometer (measured in centipoise and converted to Pascal Seconds). These data are presented in Table 3 below.

TABLE 3

| Example | 2-OA (grams) | IOA (grams) | AA (grams) | VAZO 67 (grams) | Ethyl acetate (grams) | Brookfield Viscosity (Pa s) | IV |
|---|---|---|---|---|---|---|---|
| 3 | 17.10 | — | 0.90 | 0.018 | 42.0 | 0.46 | 0.87 |
| 4 | 19.95 | — | 1.05 | 0.021 | 39.0 | 1.60 | 1.08 |
| 5 | 22.8 | — | 1.20 | 0.024 | 36.0 | 12 | 1.29 |
| C3 | — | 17.10 | 0.90 | 0.018 | 42.0 | 0.86 | 1.06 |
| C4 | — | 19.95 | 1.05 | 0.021 | 39.0 | 5.2 | 1.34 |
| C5 | — | 22.8 | 1.20 | 0.024 | 36.0 | 52 | 1.66 |

Examples 6-7 and Comparative Examples C6-C7

Part 1: Solution Polymerizations

For Examples 6-7 solution co-polymerizations of 2-OA with AA were performed as described in Examples 1-2 with the weight ratios of monomers shown in Table 4. The same procedure was used for Comparative Examples C6-C7 except that IOA was used instead of 2-OA.

Part 2: Preparation and Testing of Thermal Stability Samples

To prepare thermal stability testing samples, solution polymers with varying compositions were prepared following the general procedure described in Part 1 above. The polymer solutions were then placed into a vial along with the corresponding amount of B-212 chemical crosslinker. The weight % of B-212 is shown in Table 4. This solution was coated with a knife coater onto a silicone release liner. The knife height was set to 254 micrometers (10 mils) above the liner. The coated solution was allowed to air dry for 5 minutes to remove the solvent. The coated film was then taped onto a thin aluminum panel and placed into an oven at 150° C. for 2 minutes. The coated adhesives were allowed to equilibrate in constant temperature/constant humidity (CT/CH) room for 24 hours prior to testing. To determine the degradation onset temperature, a sample of the adhesive (approximately 20-30 milligrams) was analyzed using a TA Instruments TGA 2950 Thermogravimetric Analyzer (TA Instruments Inc., New Castle, Del.). The sample was subjected to a temperature ramp from room temperature to 500° C. at a rate of 10° C./min. The onset point of degradation was then determined from the sample weight versus temperature plot (calculated using the TA Instruments Universal Analysis software). In addition, the thermal stability of the adhesives at 150° C. and 175° C. were determined. Using the TA Instruments TGA 2950 Thermogravimetric Analyzer, the sample temperature was increased from room temperature to the desired set point (either 150° C. or 175° C.) at 200° C./min and kept at the set point for 3.5 hrs. The sample weight was monitored and the % weight loss after 3.5 hrs was determined based on the original weight of the sample. The data are presented in Table 4.

TABLE 4

| Example | 2-OA (wt %) | IOA (wt %) | AA (wt %) | B-212 (wt %) | Weight loss at 150° C. for 3.5 hours (%) | Weight loss at 175° C. for 3.5 hours (%) | Degradation Onset Temperature (° C.) |
|---|---|---|---|---|---|---|---|
| 6 | 95 | — | 5 | 0.1 | 1.0 | 9.1 | 313 |
| C6 | — | 95 | 5 | 0.1 | 3.6 | 12.7 | 352 |
| 7 | 90 | — | 10 | 0.1 | 1.3 | 4.2 | 307 |
| C7 | — | 90 | 10 | 0.1 | 2.3 | 4.0 | 339 |

Examples 8-11

Part 1: Solution Polymerizations

For Examples 8-11 solution co-polymerizations of 2-OA with AA were performed as described in Examples 1-2 above with the weight ratios shown in Table 5.

Part 2: Preparation and Testing of Tape Samples

To prepare tape samples, portions of the solutions prepared in Part 1 above were placed into a vial along with the corresponding amount of B-212 chemical crosslinker and SANTICIZER 141 plasticizer as shown in Table 5. These mixtures were coated on PLA film with a knife coater using the method described in Examples 1-2. The coated solution was allowed to air dry for 2 minutes to remove the solvent. The coated film was then taped onto a thin aluminum panel and placed into an oven at 70° C. for 5 minutes. A release liner was then placed over the coated adhesives and they were allowed to equilibrate in constant temperature/constant humidity (CT/CH) room for 24 hours prior to testing. Shear strength testing on both stainless steel (SS) and fiber board (FB) substrates was performed as described in the test methods above and the results are shown in Table 5.

TABLE 5

| Example | 2-OA (wt %) | AA (wt %) | B-212 (wt %) | SANTICIZER 141 (wt %) | Shear Strength on SS (minutes) | Shear Strength on FB (minutes) |
|---|---|---|---|---|---|---|
| 8 | 95 | 5 | 0.1 | 0 | 6706 | 359 |
| 9 | 95 | 5 | 0.1 | 1.0 | 8478 | 167 |
| 10 | 95 | 5 | 0.1 | 1.5 | 6648 | 479 |
| 11 | 95 | 5 | 0.1 | 2.0 | 5266 | 440 |

The invention claimed is:

1. An adhesive composition comprising a copolymer comprising the reaction product of:
   1) 90 to 99.5 wt. % of 2-octyl(meth)acrylate;
   2) 0.5 to 10 wt. % of a (meth)acrylic acid comonomer; and
   3) less than 10 wt. % of other monomers, relative to the combined weight of 1) and 2).

2. The adhesive of claim 1, wherein the other monomers are primary octyl acrylates.

3. The adhesive of claim 1, wherein the (meth)acrylic acid comonomer is selected from the group consisting of acrylic acid, methacrylic acid, and combinations thereof.

4. An adhesive article comprising the adhesive of claim 1 and a backing.

5. The adhesive article of claim 4, wherein the backing is selected from polyolefins, polystyrene, polyester, polyvinyl chloride, polyvinyl alcohol, polyurethane, poly(vinylidene fluoride), cellulose and cellulose derivatives.

* * * * *

UNITED STATES PATENT AND TRADEMARK OFFICE
CERTIFICATE OF CORRECTION

PATENT NO. : 7,893,179 B2
APPLICATION NO. : 12/102579
DATED : February 22, 2011
INVENTOR(S) : Kelly Sharon Anderson It is certified that error appears in the above-identified patent and that said Letters Patent is hereby corrected as shown below:

Column 1
Line 42 (approx.), delete "acryclic" and insert -- acrylic --, therefor.

Column 2
Line 29, delete "isoctyl" and insert -- isooctyl --, therefor.

Line 31, delete "form" and insert -- from --, therefor.

Column 6
Line 2, delete "1,3-oxazyl" and insert -- 1,3-oxazol --, therefor.

Line 12, delete "1,3-oxazyl" and insert -- 1,3-oxazol --, therefor.

Line 15, delete "1,3-oxazyl" and insert -- 1,3-oxazol --, therefor.

Column 7
Lines 33 – 34, delete "napthalene" and insert -- naphthalene --, therefor.

Line 47, delete "allophonate" and insert -- allophanate --, therefor.

Column 9
Line 12, delete "diisoctyl" and insert -- diisooctyl --, therefor.

Column 11
Line 36, delete "homopolmer," and insert -- homopolymer, --, therefor.

Line 62, delete "tetramethyglycolide," and insert -- tetramethylglycolide, --, therefor.

Signed and Sealed this
Twelfth Day of February, 2013

Teresa Stanek Rea
*Acting Director of the United States Patent and Trademark Office*

Column 13
Line 67, after "(Yield: 248.6 grams)" insert -- . --.